United States Patent
Wiggins, Jr.

(10) Patent No.: US 8,905,459 B1
(45) Date of Patent: Dec. 9, 2014

(54) HOOD/PANEL COVER FOR VEHICLES

(71) Applicant: James A. Wiggins, Jr., Virginia Beach, VA (US)

(72) Inventor: James A. Wiggins, Jr., Virginia Beach, VA (US)

(*) Notice: Subject to any disclaimer, the term of this patent is extended or adjusted under 35 U.S.C. 154(b) by 0 days.

(21) Appl. No.: 13/857,717

(22) Filed: Apr. 5, 2013

(51) Int. Cl.
*B60J 11/06* (2006.01)

(52) U.S. Cl.
CPC ...................................... *B60J 11/06* (2013.01)
USPC ............. 296/136.07; 296/136.01; 296/136.08

(58) Field of Classification Search
CPC ............ B60J 11/00; B60J 11/04; B60J 11/06; B60R 13/04
USPC ............... 296/136.01, 136.07, 136.08, 136.1, 296/136.02, 95.1; 150/166; 280/770; 135/88.01, 88.03, 88.05, 88.07, 88.08; 160/370.21
See application file for complete search history.

(56) References Cited

U.S. PATENT DOCUMENTS

| | | | |
|---|---|---|---|
| 1,524,434 A | | 1/1925 | Heinemann et al. |
| 1,631,663 A | | 6/1927 | Wilhelm |
| 4,997,229 A | * | 3/1991 | Swanson .................. 296/136.08 |
| 5,042,836 A | * | 8/1991 | Swanson ....................... 280/770 |
| 5,944,347 A | | 8/1999 | Pechman |
| 6,099,067 A | * | 8/2000 | Butterworth ............. 296/136.07 |
| 6,273,493 B1 | * | 8/2001 | Woo ......................... 296/136.07 |
| 7,125,066 B2 | | 10/2006 | McNamee |
| 7,182,391 B2 | * | 2/2007 | Thrasher et al. .......... 296/136.02 |
| 7,264,299 B2 | * | 9/2007 | Wall, II .................... 296/136.07 |
| 7,611,186 B2 | * | 11/2009 | Metzikis ...................... 296/78.1 |
| 2005/0280283 A1 | * | 12/2005 | Douglas ..................... 296/136.1 |
| 2006/0284444 A1 | * | 12/2006 | Wall, II .................... 296/136.07 |

* cited by examiner

*Primary Examiner* — Gregory Blankenship
(74) *Attorney, Agent, or Firm* — Richard L. Miller

(57) ABSTRACT

A cover that replaceably attaches to a hood having peripheral edges of a vehicle having an engine bay without interfering with the engine bay of the vehicle and to thereby cover and protect an ambient-facing surface of the hood of the vehicle. The cover includes a sheet, and a strap arrangement. The sheet covers, protects, and lies flat on, the ambient-facing surface of the hood of the vehicle. The strap arrangement is attached to the sheet, and replaceably attaches the sheet to the hood of the vehicle without interfering with the engine bay of the vehicle.

26 Claims, 4 Drawing Sheets

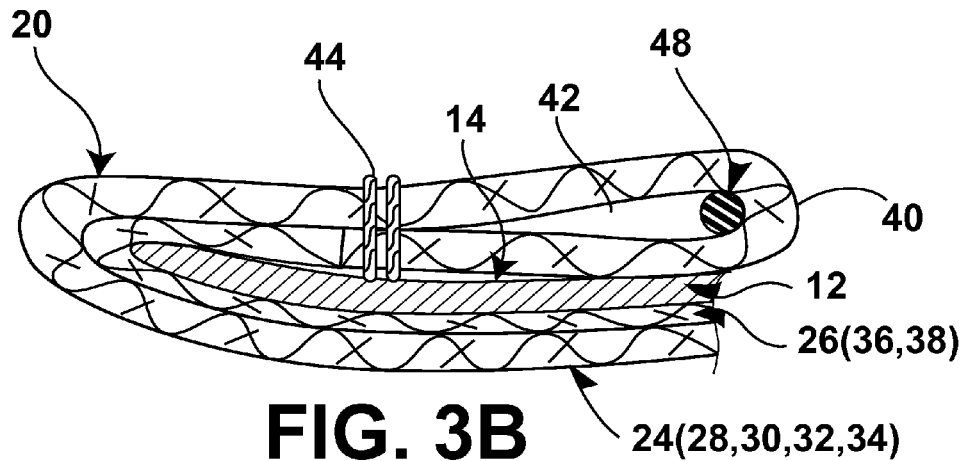
FIG. 3B
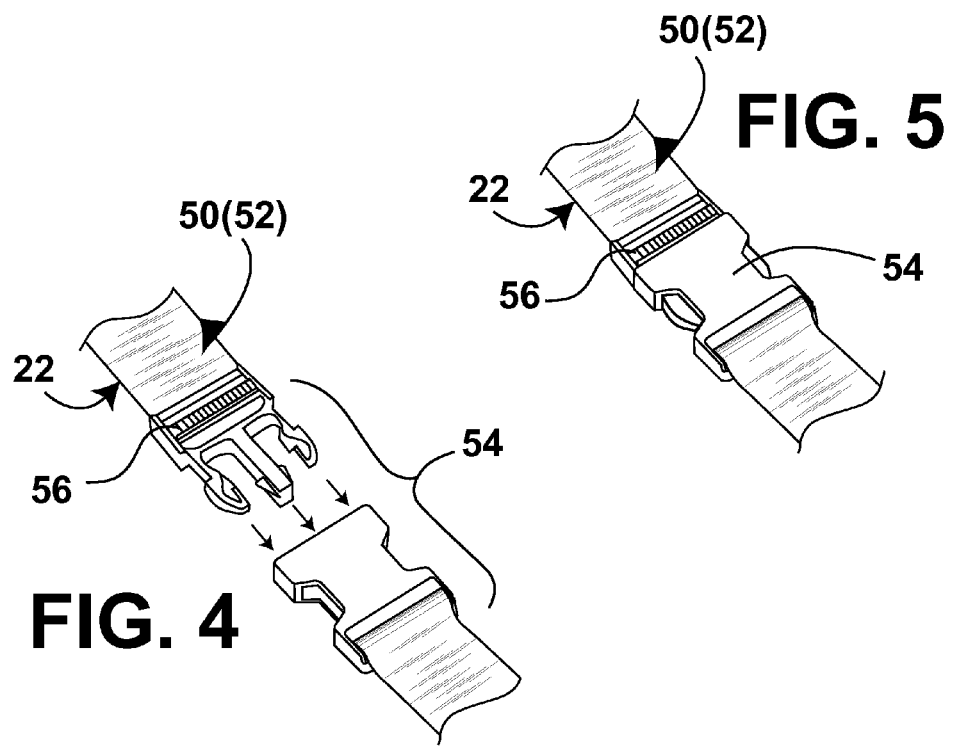
FIG. 5
FIG. 4

HOOD/PANEL COVER FOR VEHICLES

1. BACKGROUND OF THE INVENTION

A. Field of the Invention

The embodiments of the present invention relate to a cover for replaceably attaching to a hood of a vehicle, and more particularly, the embodiments of the present invention relate to a cover for replaceably attaching to a hood having peripheral edges of a vehicle having an engine bay without interfering with the engine bay of the vehicle and to thereby cover and protect an ambient-facing surface of the hood of the vehicle.

B. Description of the Prior Art

Automobile hood covers and bras are a common automobile accessory, which can be fitted to any vehicle hood, regardless of size, shape, or style. Hood covers and bras protect the hood and front of the vehicle from damages from bugs, stones, and other debris, as well as, hide paint chips, scratches, and dings. Hood covers and bras can also enhance the aesthetic appearance of the vehicle.

Numerous innovations for vehicle hood covers have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a cover for replaceably attaching to a hood having peripheral edges of a vehicle having an engine bay without interfering with the engine bay of the vehicle and to thereby cover and protect an ambient-facing surface of the hood of the vehicle.

(1) U.S. Pat. No. 1,524,434 to Heinemann et al.

U.S. Pat. No. 1,524,434 issued to Heinemann et al. on Jan. 27, 1925 in U.S. class 180 and subclass 68.2 teaches a hood cover provided with a flap adapted top be positioned beneath a rear margin of a pivoted leaf of a hood of a motor vehicle.

(2) U.S. Pat. No. 1,631,663 to Wilhelm.

U.S. Pat. No. 1,631,663 issued to Wilhelm on Jun. 7, 1927 in U.S. class 165 and subclass 134.1 teaches an automobile hood cover including a body having an arched top shaped to conform to the top of the hood and radiator, a pair of depending side walls to cover the sides of the hood, a web depending from the forward end of the top, and a pair of swingable mounted radiator flaps carried by the forward ends of the side walls. The adjacent edges of the flaps are disposed in overlapping relation with the upper ends located beneath the web when the flaps are in operative position. Apparatus detachably connects the overlapping ends of the flaps together.

(3) U.S. Pat. No. 5,944,347 to Pechman.

U.S. Pat. No. 5,944,347 issued to Pechman on Aug. 31, 1999 in U.S. class 280 and subclass 770 teaches an automobile hood cover including a flexible planar substrate of vinyl coated fabric or other plastic material. The substrate has substantially all of its exterior outwardly facing surface covered with protective and decorative lace apparatus, namely, either lace cloth or lace indicia. The cloth or indicia form a lace pattern including regularly recurring sets of discrete graphical motifs.

(4) U.S. Pat. No. 7,125,066 to McNamee.

U.S. Pat. No. 7,125,066 issued to McNamee on Oct. 24, 2006 in U.S. class 296 and subclass 136.07 teaches a vehicle cover system including removably attachable mating cover portions adapted to cover a vehicle having a top, a bottom, opposing sides, a front end, and a rear end. Each removably attachable mating cover portion removably attaches to and mates with at least one adjacent one of the removably attachable mating cover portions. The removably attachable mating cover portions include at least one substantially U shaped cover portion adapted to cover a portion of the top and an adjacent portion of each of the opposing sides of the vehicle, front and rear end portions adapted to cover the front end and the rear end of the vehicle, respectively. The front and rear end portions are each removably attached to the at least one substantially U shaped cover portion.

(5) United States Patent Application Publication Number 2006/0284444 to Wall.

United States Patent Application Publication Number 2006/0284444 published to Wall on Dec. 21, 2006 in U.S. class 296 and subclass 136.07 teaches a hood cover that is constructed from a sheet of elastic, weather-resistant fabric, which allows the hood cover to stretch tightly around the peripheral edges of the vehicle hood and lie flat across the top surface of the vehicle hood. The hood cover is secured to the vehicle hood by a draw string and by two adjustable tension straps. The first tension strap pulls the hood cover tight around rear hood corners. The second tension strap pulls the hood cover tight around the convex leading edge and the concave rear edge of the vehicle hood. The fabric from which the hood cover is constructed prevents the distortion of decorative graphic artwork within certain areas of the hood cover. The blend, weave, and set of the fabric gives the hood cover sequential elasticity that allows fabric stretch to be isolated and localized around the periphery of the vehicle hood so that the central area of the hood cover remains primarily unstretched. Consequently, graphics and artwork are applicable and arrangeable on the hood cover to minimize any distortions caused by stretching the hood cover over any particular vehicle hood.

It is apparent that numerous innovations for vehicle hood covers have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a cover for replaceably attaching to a hood having peripheral edges of a vehicle having an engine bay without interfering with the engine bay of the vehicle and to thereby cover and protect an ambient-facing surface of the hood of the vehicle.

2. SUMMARY OF THE INVENTION

Thus, an object of the embodiments of the present invention is to provide a cover for replaceably attaching to a hood having peripheral edges of a vehicle having an engine bay without interfering with the engine bay of the vehicle and to thereby cover and protect an ambient-facing surface of the hood of the vehicle, which avoids the disadvantages of the prior art.

Briefly stated, another object of the embodiments of the present invention is to provide a cover that replaceably attaches to a hood having peripheral edges of a vehicle having an engine bay without interfering with the engine bay of the vehicle and to thereby cover and protect an ambient-facing surface of the hood of the vehicle. The cover includes a sheet, and a strap arrangement. The sheet covers, protects, and lies flat on, the ambient-facing surface of the hood of the vehicle. The strap arrangement is attached to the sheet, and replaceably attaches the sheet to the hood of the vehicle without interfering with the engine bay of the vehicle.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 3B is an enlarged diagrammatic cross sectional view taken along LINE 3B-3B in FIG. 3A of the corner pocket of the cover of the embodiments of the present invention;

Figure 3:
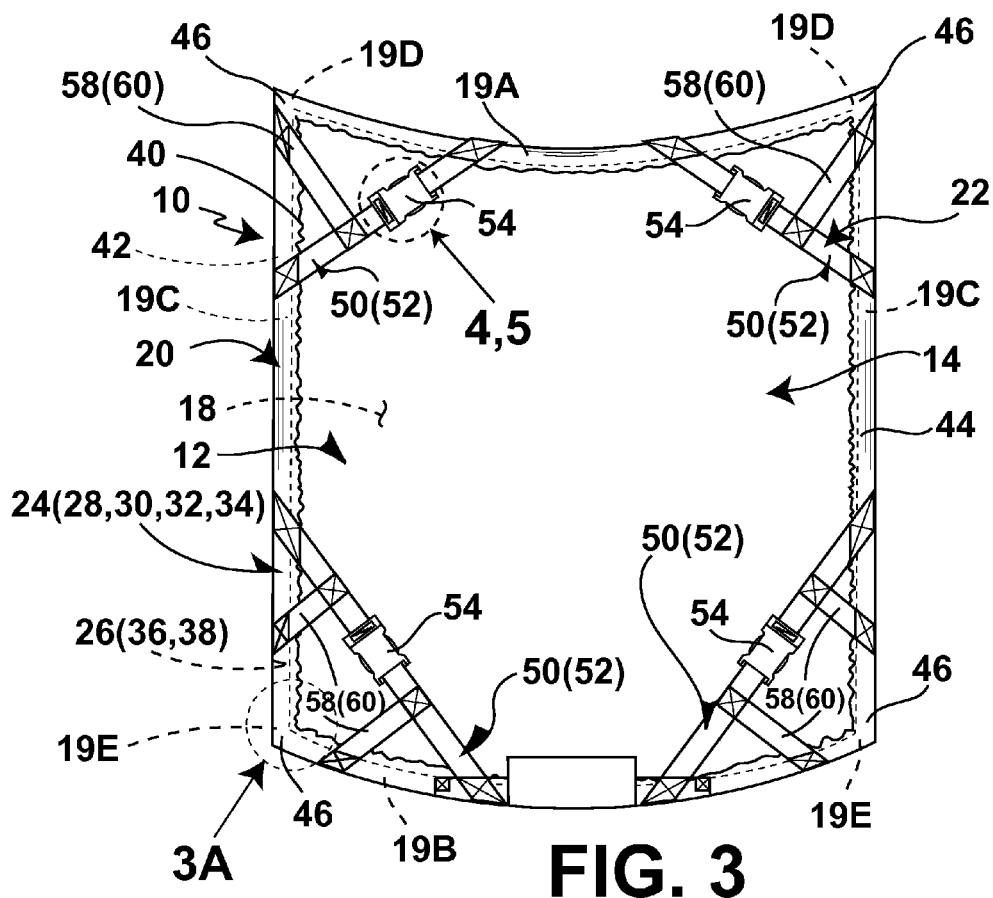
FIG. 3 is a diagrammatic bottom plan view of the cover of the embodiments of the present invention identified by ARROW 3 in FIG. 2 and replaceably attached to a hood of a vehicle.

FIG. 4 is an enlarged and exploded diagrammatic perspective view of the area generally enclosed by the dotted circle identified by ARROW 4 in FIG. 3 of a quick release connector of the cover of the embodiments of the present invention open; and FIG. 5 is an enlarged and exploded diagrammatic perspective view of the area generally enclosed by the dotted circle identified by ARROW 5 in FIG. 3 of the quick release connector of the cover of the embodiments of the present invention closed.

4. LIST OF REFERENCE NUMERALS UTILIZED IN THE FIGURES OF THE DRAWING

A. Introductory 10 cover of embodiments of present invention for replaceably attaching to hood 12 having peripheral edges 13 of vehicle 14 having engine bay 16 without interfering with engine bay 16 of vehicle 14 and to thereby cover and protect ambient-facing surface 18 of hood 12 of vehicle 14
12 hood of vehicle 14
13 peripheral edges of hood 12 of vehicle 14
14 vehicle
16 engine bay of vehicle 14
18 ambient-facing surface of hood 12 of vehicle 14
19a trailing edge of hood 12 of vehicle 14
19b leading edge of hood 12 of vehicle 14
19c pair of side edges of hood 12 of vehicle 14
19d pair of rear corners of hood 12 of vehicle 14
19e pair of front corners of hood 12 of vehicle 14

B. Configuration of Cover 10

20 sheet for covering, protecting, and lying flat on, ambient-facing surface 18 of hood 12 of vehicle 14
22 strap arrangement for replaceably attaching sheet 20 to hood 12 of vehicle 14 without interfering with engine bay 16 of vehicle 14

C. Specific Configuration of Sheet 20

24 exterior layer of sheet 20
26 interior layer of sheet 20 for overlying ambient-facing surface 18 of hood 12 of vehicle 14
28 weather-resistant material of exterior layer 24 of sheet 20
30 leather of weather-resistant material 28 of exterior layer 24 of sheet 20
32 cloth of weather-resistant material 28 of exterior layer 24 of sheet 20
34 vinyl of weather-resistant material 28 of exterior layer 24 of sheet 20
36 cloth of interior layer 26 of sheet 20
38 fleece of interior layer 26 of sheet 20
40 periphery of sheet 20
42 hemmed passageway of periphery 40 of sheet 20 for underlying and receiving trailing edge 19a of hood 12 of vehicle 14, leading edge 19b of hood 12 of vehicle 14, pair of side edges 19c of hood 12 of vehicle 14, pair of rear corners 19d of hood 12 of vehicle 14, and pair of front corners 19e of hood 12 of vehicle 14
44 stitches of hemmed passageway 42 of periphery 40 of sheet 20
46 corner pockets of hemmed passageway 42 of periphery 40 of sheet 20 for underlying and receiving pair of rear corners 19d of hood 12 of vehicle 14, and pair of front corners 19c of hood 12 of vehicle 14
48 elastic strip of sheet 20 for replaceably securing sheet 20 to hood 12 of vehicle 14, with hemmed passageway 42 of periphery 40 of sheet 20 replaceably receiving trailing edge 19a of hood 12 of vehicle 14, leading edge 19b of hood 12 of vehicle 14, pair of side edges 19c of hood 12 of vehicle 14, pair of rear corners 19d of hood 12 of vehicle 14, and pair of front corners 19e of hood 12 of vehicle 14, and with corner pockets 46 of hemmed passageway 42 of periphery 40 of sheet 20 replaceably receiving pair of rear corners 19d of hood 12 of vehicle 14, and pair of front corners 19e of hood 12 of vehicle 14

D. Specific Configuration of Strap Arrangement 22

50 primary straps of strap arrangement 22
52 nylon of primary straps 50 of strap arrangement 22
54 quick release connectors of primary straps 50 of strap arrangement 22
56 length adjustable portions of quick release connectors 54 of primary straps 50 of strap arrangement 22
58 secondary tension straps of strap arrangement 22
60 elastic of secondary tension straps 58 of strap arrangement 22

5. DETAILED DESCRIPTION OF THE PREFERRED EMBODIMENTS

A. Introductory

Figure 1:
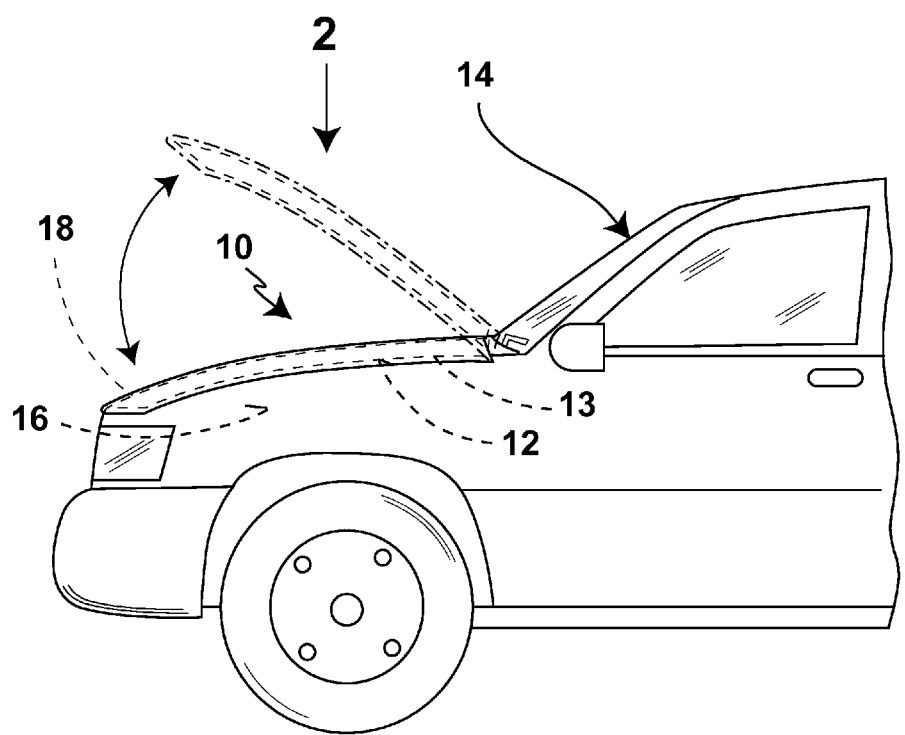
FIG. 1 is a diagrammatic side elevational view of the cover of the embodiments of the present invention replaceably attached to a hood having peripheral edges of a vehicle having an engine bay without interfering with the engine bay of the vehicle and to thereby cover and protect an ambient-facing surface of the hood of the vehicle.
Figure 2:
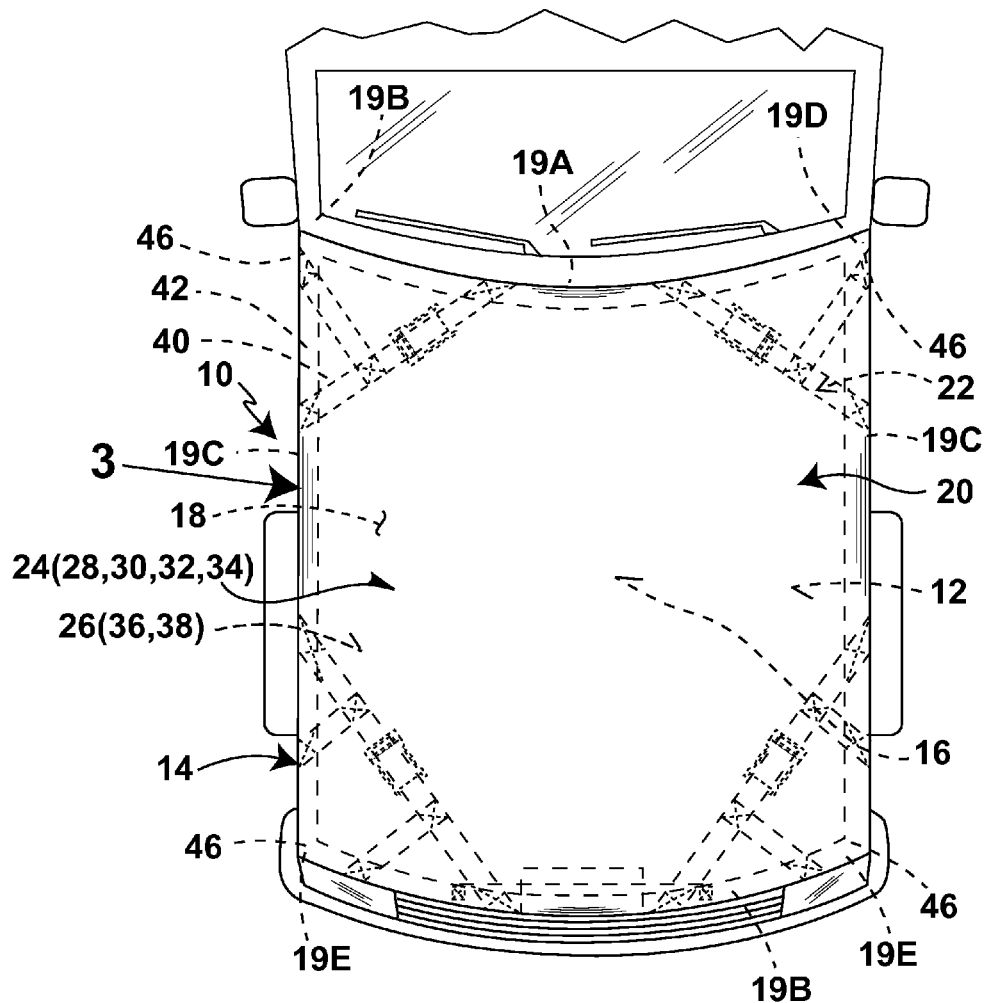
FIG. 2 is an enlarged diagrammatic top plan view taken generally in the direction of ARROW 2 in FIG. 1 of the cover of the embodiments of the present invention replaceably attached to a hood having peripheral edges of a vehicle having an engine bay without interfering with the engine bay of the vehicle and to thereby cover and protect an ambient-facing surface of the hood of the vehicle.
Figure 3A:
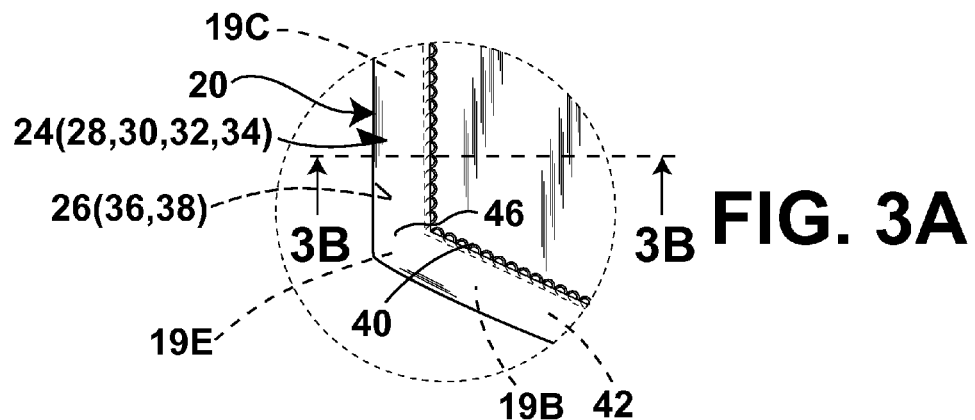
FIG. 3A is an enlarged diagrammatic bottom plan view of the area generally enclosed by the dotted circle identified by ARROW 3A in FIG. 3 of a corner pocket of the cover of the embodiments of the present invention.

Referring now to the figures, in which like numerals indicate like parts, and particularly to FIG. 1, which is a diagrammatic side elevational view of the cover of the embodiments of the present invention replaceably attached to a hood having peripheral edges of a vehicle having an engine bay without interfering with the engine bay of the vehicle and to thereby cover and protect an ambient-facing surface of the hood of the vehicle, the cover of the embodiments of the present invention is shown generally at 10 for replaceably attaching to a hood 12 having peripheral edges 13 of a vehicle 14 having an engine bay 16 without interfering with the engine bay 16 of the vehicle 14 and to thereby cover and protect an ambient-facing surface 18 of the hood 12 of the vehicle 14, wherein the hood 12 of the vehicle 14 has a trailing edge 19a, a leading edge 19b, a pair of side edges 19c, a pair of rear corners 19d, and a pair of front corners 19e (FIGS. 2, 3, and 3A).

B. The Configuration of the Cover 10

The configuration of the cover 10 can best be seen in FIGS. 2 and 3, which are, respectively, an enlarged diagrammatic top plan view taken generally in the direction of ARROW 2 in FIG. 1 of the cover of the embodiments of the present invention replaceably attached to a hood having peripheral edges of a vehicle having an engine bay without interfering with the engine bay of the vehicle and to thereby cover and protect an ambient-facing surface of the hood of the vehicle, and a diagrammatic bottom plan view of the cover of the embodiments of the present invention identified by ARROW 3 in FIG. 2 and replaceably attached to a hood of a vehicle, and as such, will be discussed with reference thereto.

The cover 10 comprises a sheet 20 and a strap arrangement 22.

The sheet 20 is for covering, protecting, and lying flat on, the ambient-facing surface 18 of the hood 12 of the vehicle 14. The strap arrangement 22 is attached to the sheet 20, and is for replaceably attaching the sheet 20 to the hood 12 of the vehicle 14 without interfering with the engine bay 16 of the vehicle 14.

C. The Specific Configuration of the Sheet 20

The specific configuration of the sheet 20 can best be seen in FIGS. 2, 3, 3A, and 3B, which are, respectively, again, an enlarged diagrammatic top plan view taken generally in the direction of ARROW 2 in FIG. 1 of the cover of the embodiments of the present invention replaceably attached to a hood having peripheral edges of a vehicle having an engine bay without interfering with the engine buy of the vehicle and to thereby cover and protect an ambient-facing surface of the hood of the vehicle, again, a diagrammatic bottom plan view of the cover of the embodiments of the present invention identified by ARROW 3 in FIG. 2 and replaceably attached to a hood of a vehicle, an enlarged diagrammatic bottom plan view of the area generally enclosed by the dotted circle identified by ARROW 3A in FIG. 3 of a corner pocket of the cover of the embodiments of the present invention, and an enlarged diagrammatic cross sectional view taken along LINE 3II-3B in FIG. 3A of the corner pocket of the cover of the embodiments of the present invention, and as such, will be discussed with reference thereto.

The sheet 20 has an exterior layer 24, and an interior layer 26.

The exterior layer 24 of the sheet 20 overlies, and is attached to, the interior layer 26, and the interior layer 26 of the sheet 20 is for overlying the ambient-facing surface 18 of the hood 12 of the vehicle 14.

The exterior layer 24 of the sheet 20 is made of a weather-resistant material 28.

The weather-resistant material 28 of the exterior layer 24 of the sheet 20 is, preferably, made of leather 30, cloth 32, or vinyl 34.

The interior layer 26 of the sheet 20 is, preferably, made of cloth 36 or fleece 38.

The sheet 20 further has a periphery 40. The periphery 40 of the sheet 20 is folded downwardly upon its self to form a hemmed passageway 42.

The hemmed passageway 42 of the periphery 40 of the sheet 20 is maintained by stitches 44, and is for underlying and receiving the trailing edge 19a of the hood 12 of the vehicle 14, the leading edge 19b of the hood 12 of the vehicle 14, the pair of side edges 19c of the hood 12 of the vehicle 14, the pair of rear corners 19d of the hood 12 of the vehicle 14, and the pair of front corners 19e of the hood 12 of the vehicle 14.

The hemmed passageway 42 of the periphery 40 of the sheet 20 has corner pockets 46.

The corner pockets 46 of the hemmed passageway 42 of the periphery 40 of the sheet 20 are, preferably 45°, and are for underlying and receiving the pair of rear corners 19d of the hood 12 of the vehicle 14, and the pair of front corners 19e of the hood 12 of the vehicle 14.

The exterior layer 24 of the sheet 20 is smooth, shinny, lusterous, allows water to run thereoff, and wicks water on the ambient-facing surface 18 of the hood 12 of the vehicle 14 thereaway.

The sheet 20 further has an elastic strip 48.

The elastic strip 48 of the sheet 20 extends through the hemmed passageway 42 of the periphery 40 of the sheet 20, and is for replaceably securing the sheet 20 to the hood 12 of the vehicle 14, with the hemmed passageway 42 of the periphery 40 of the sheet 20 replaceably receiving the trailing edge 19a of the hood 12 of the vehicle 14, the leading edge 19b of the hood 12 of the vehicle 14, the pair of side edges 19c of the hood 12 of the vehicle 14, the pair of rear corners 19d of the hood 12 of the vehicle 14, and the pair of front corners 19e of the hood 12 of the vehicle 14, and with the corner pockets 46 of the hemmed passageway 42 of the periphery 40 of the sheet 20 replaceably receiving the pair of rear corners 19d of the hood 12 of the vehicle 14, and the pair of front corners 19e of the hood 12 of the vehicle 14.

The interior layer 26 of the sheet 20 extends up to, without overlapping but abutting, the hemmed passageway 42 of the periphery 40 of the sheet 20 so as to avoid lumps thereat.

D. The Specific Configuration of the Strap Arrangement 22

The specific configuration of the strap arrangement 22 can best be seen in FIGS. 3, 4, and 5, which are, respectively, again, a diagrammatic bottom plan view of the cover of the embodiments of the present invention identified by ARROW 3 in FIG. 2 and replaceably attached to a hood of a vehicle, an enlarged and exploded diagrammatic perspective view of the area generally enclosed by the dotted circle identified by ARROW 4 in FIG. 3 of a quick release connector of the cover of the embodiments of the present invention open, and an enlarged and exploded diagrammatic perspective view of the area generally enclosed by the dotted circle identified by ARROW 5 in FIG. 3 of the quick release connector of the cover of the embodiments of the present invention closed, and as such, will be discussed with reference thereto.

The strap arrangement 22, together with the elastic strip 48 of the sheet 20, are for pulling the sheet 20 tight to the hood 12 of the vehicle 14.

The strap arrangement 22 comprises primary straps 50.

The primary straps 50 of the strap arrangement 22 have lengths, and extend diagonally across adjacent portions of the hemmed passageway 42 of the periphery 40 of the sheet 20.

The primary straps 50 of the strap arrangement 22 straddle in close proximity the corner pockets 46 of the hemmed passageway 42 of the periphery 40 of the sheet 20, respectively, so as not to extend along a major portion of the sheet 20 and interfere with the engine bay 16 of the vehicle 14, especially since the hood 12 of the vehicle 14 curves majorally in mutually orthogonal directions.

The primary straps 50 of the strap arrangement 22 are made of nylon 52.

The primary straps 50 of the strap arrangement 22 comprise quick release connectors 54, respectively.

The quick release connectors 54 of the primary straps 50 of the strap arrangement 22 have length adjustable portions 56, respectively.

The length adjustable portions 56 of the quick release connectors 54 of the primary straps 50 of the strap arrangement 22 allow adjusting the lengths of the primary straps 50 of the strap arrangement 22, respectively.

The strap arrangement 22 further comprises secondary tension straps 58.

The secondary tension straps 58 of the strap arrangement 22 extend normally from the primary straps 50 of the strap arrangement 22, respectively, to an associated corner pocket 46 of the hemmed passageway 42 of the periphery 40 of the sheet 20.

The secondary tension straps 58 of the strap arrangement 22 are made of elastic 60.

E. Impressions

It will be understood that each of the elements described above or two or more together may also find a useful application in other types of constructions differing from the types described above.

While the embodiments of the present invention have been illustrated and described as embodied in a cover for replaceably attaching to a hood having peripheral edges of a vehicle having an engine bay without interfering with the engine bay of the vehicle and to thereby cover and protect an ambient-facing surface of the hood of the vehicle, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A cover for replaceably attaching to a hood having peripheral edges of a vehicle having an engine bay without interfering with the engine bay of the vehicle and to thereby cover and protect an ambient-facing surface of the hood of the vehicle, wherein the hood of the vehicle has a trailing edge, a leading edge, a pair of side edges, a pair of rear corners, and a pair of front corners, comprising:
   a) a sheet;
   b) a strap arrangement;
   wherein said sheet is for covering the ambient-facing surface of the hood of the vehicle;
   wherein said sheet is for protecting the ambient-facing surface of the hood of the vehicle;
   wherein said sheet is for lying flat on the ambient-facing surface of the hood of the vehicle;
   wherein said strap arrangement is attached to said sheet;
   wherein said strap arrangement is for replaceably attaching said sheet to the hood of the vehicle without interfering with the engine bay of the vehicle;
   wherein said sheet has:
   a) an exterior layer;
   b) an interior layer;
   wherein said sheet has a periphery;
   wherein said periphery of said sheet is folded downwardly upon its self to form a hemmed passageway;
   wherein said hemmed passageway of said periphery of said sheet is for underlying and receiving the trailing edge of the hood of the vehicle, the leading edge of the hood of the vehicle, the pair of side edges of the hood of the vehicle, the pair of rear corners of the hood of the vehicle, and the pair of front corners of the hood of the vehicle; and
   wherein said interior layer of said sheet extends up to, without overlapping but abutting, said hemmed passageway of said periphery of said sheet so as to avoid lumps thereat.

2. The cover of claim 1, wherein said exterior layer of said sheet overlies said interior layer; and
   wherein said interior layer of said sheet is for overlying the ambient-facing surface of the hood of the vehicle.

3. The cover of claim 1, wherein said exterior layer of said sheet is attached to said interior layer.

4. The cover of claim 1, wherein said exterior layer of said sheet is made of a weather-resistant material.

5. The cover of claim 4, wherein said weather-resistant material of said exterior layer of said sheet is leather.

6. The cover of claim 4, wherein said weather-resistant material of said exterior layer of said sheet is cloth.

7. The cover of claim 4, wherein said weather-resistant material of said exterior layer of said sheet is vinyl.

8. The cover of claim 1, wherein said interior layer of said sheet is made of cloth.

9. The cover of claim 1, wherein said interior layer of said sheet is made of fleece.

10. The cover of claim 1, wherein said hemmed passageway of said periphery of said sheet is maintained by stitches.

11. The cover of claim 1, wherein said exterior layer of said sheet is smooth.

12. The cover of claim 1, wherein said exterior layer of said sheet is shiny.

13. The cover of claim 1, wherein said exterior layer of said sheet is lusterous.

14. The cover of claim 1, wherein said exterior layer of said sheet allows water to run thereoff.

15. The cover of claim 1, wherein said exterior layer of said sheet wicks water on the ambient-facing surface of the hood of the vehicle thereaway.

16. The cover of claim 1, wherein said sheet has an elastic strip.

17. The cover of claim 16, wherein said elastic strip of said sheet extends through said hemmed passageway of said periphery of said sheet;

wherein said elastic strip of said sheet is for replaceably securing said sheet to the hood of the vehicle;

wherein said hemmed passageway of said periphery of said sheet replaceably receives the trailing edge of the hood of the vehicle, the leading edge of the hood of the vehicle, the pair of side edges of the hood of the vehicle, the pair of rear corners of the hood of the vehicle, and the pair of front corners of the hood of the vehicle; and wherein said corner pockets of said hemmed passageway of said periphery of said sheet is for replaceably receiving the pair of rear corners of the hood of the vehicle and the pair of front corners of the hood of the vehicle.

18. A cover for replaceably attaching to a hood having peripheral edges of a vehicle having an engine bay without interfering with the engine bay of the vehicle and to thereby cover and protect an ambient-facing surface of the hood of the vehicle, wherein the hood of the vehicle has a trailing edge, a leading edge, a pair of side edges, a pair of rear corners, and a pair of front corners, comprising:

a) a sheet;
b) a strap arrangement;

wherein said sheet is for covering the ambient-facing surface of the hood of the vehicle;

wherein said sheet is for protecting the ambient-facing surface of the hood of the vehicle;

wherein said sheet is for lying flat on the ambient-facing surface of the hood of the vehicle;

wherein said strap arrangement is attached to said sheet;

wherein said strap arrangement is for replaceably attaching said sheet to the hood of the vehicle without interfering with the engine bay of the vehicle;

wherein said sheet has:
a) an exterior layer;
b) an interior layer;

wherein said sheet has a periphery;

wherein said periphery of said sheet is folded downwardly upon its self to form a hemmed passageway;

wherein said hemmed passageway of said periphery of said sheet is for underlying and receiving the trailing edge of the hood of the vehicle, the leading edge of the hood of the vehicle, the pair of side edges of the hood of the vehicle, the pair of rear corners of the hood of the vehicle, and the pair of front corners of the hood of the vehicle;

wherein said strap arrangement comprises primary straps;

wherein said primary straps of said strap arrangement extend diagonally across adjacent portions of said hemmed passageway of said periphery of said sheet; and wherein said primary straps of said strap arrangement straddle in close proximity said corner pockets of said hemmed passageway of said periphery of said sheet, respectively, so as not to extend along a major portion of said sheet and interfere with the engine bay of the vehicle.

19. The cover of claim 18, wherein said primary straps of said strap arrangement are made of nylon.

20. The cover of claim 18, wherein said primary straps of said strap arrangement comprise quick release connectors, respectively.

21. The cover of claim 20, wherein said quick release connectors of said primary straps of said strap arrangement have length adjustable portions, respectively.

22. The cover of claim 21, wherein said primary straps of said strap arrangement have lengths; and wherein said length adjustable portions of said quick release connectors of said primary straps of said strap arrangement allow adjusting said lengths of said primary straps of said strap arrangement, respectively.

23. The cover of claim 18, wherein said strap arrangement comprises secondary tension straps.

24. The cover of claim 23, wherein said secondary tension straps of said strap arrangement extend from said primary straps of said strap arrangement, respectively, to an associated corner pocket of said hemmed passageway of said periphery of said sheet.

25. The cover of claim 23, wherein said secondary tension straps of said strap arrangement extend normally from said primary straps of said strap arrangement, respectively, to an associated corner pocket of said hemmed passageway of said periphery of said sheet.

26. The cover of claim 23, wherein said secondary tension straps of said strap arrangement are made of elastic.

* * * * *